US009016414B2

(12) United States Patent
Shimomura et al.

(10) Patent No.: US 9,016,414 B2
(45) Date of Patent: Apr. 28, 2015

(54) AIR CLEANER DEVICE FOR VEHICLE

(71) Applicant: Honda Motor Co., Ltd., Tokyo (JP)

(72) Inventors: Nobuyuki Shimomura, Wako (JP);
Tatsuya Suzuki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 98 days.

(21) Appl. No.: 13/710,467

(22) Filed: Dec. 11, 2012

(65) Prior Publication Data

US 2013/0192912 A1 Aug. 1, 2013

(30) Foreign Application Priority Data

Jan. 31, 2012 (JP) ................................ 2012-019109

(51) Int. Cl.
| F02M 35/16 | (2006.01) |
| F02M 35/024 | (2006.01) |
| B01D 46/00 | (2006.01) |
| B60K 13/02 | (2006.01) |

(52) U.S. Cl.
CPC ....... *F02M 35/02416* (2013.01); *B01D 46/005* (2013.01); *B60K 13/02* (2013.01); *F02M 35/02466* (2013.01); *F02M 35/162* (2013.01); *F02M 35/02491* (2013.01)

(58) Field of Classification Search
CPC ........... B01D 46/0005; B01D 46/0002; B01D 46/0006; B01D 2279/60; F02M 25/0248; F02M 25/02466; F02M 25/02411; F02M 25/02491; F02M 25/04; F02M 25/048; F02M 25/162; F02M 2035/02; B60K 11/04
USPC .................. 180/219, 68.3, 89.2; 55/DIG. 28; 123/198 E
See application file for complete search history.

(56) References Cited

U.S. PATENT DOCUMENTS

| 4,484,651 | A | * | 11/1984 | Hattori et al. ................. 180/225 |
| 5,725,624 | A | * | 3/1998 | Ernst et al. ..................... 55/502 |
| 6,203,592 | B1 | * | 3/2001 | Carawan ........................ 55/484 |
| 6,464,761 | B1 | * | 10/2002 | Bugli ............................. 96/135 |
| 6,840,973 | B2 | * | 1/2005 | Kuji et al. ..................... 55/385.3 |
| 7,766,119 | B2 | * | 8/2010 | Yokoi et al. ................... 180/311 |
| 8,105,406 | B2 | * | 1/2012 | Nishizawa et al. .......... 55/385.3 |
| 8,302,722 | B2 | * | 11/2012 | Fujiyama ...................... 180/219 |
| 8,460,421 | B2 | * | 6/2013 | Troxell et al. ................ 55/385.3 |
| 2009/0301046 | A1 | * | 12/2009 | Felber et al. .................... 55/502 |
| 2011/0232983 | A1 | * | 9/2011 | Abe et al. ..................... 180/68.3 |
| 2013/0220260 | A1 | * | 8/2013 | Ohniwa et al. ........... 123/184.46 |

FOREIGN PATENT DOCUMENTS

JP 2001-221113 8/2001

* cited by examiner

*Primary Examiner* — J. Allen Shriver, II
*Assistant Examiner* — Emma K Frick
(74) *Attorney, Agent, or Firm* — Mori & Ward, LLP

(57) ABSTRACT

An air cleaner device for a vehicle includes an air cleaner case body, a lid, a resin air cleaner element, and an element guard assembly. The air cleaner case body includes a peripheral wall defining an opening portion. The element guard assembly is provided inside the peripheral wall of the air cleaner case body. The element guard assembly includes a periphery, a side surface, and a seal wall. The periphery of the element guard assembly contacts a part of the peripheral wall of the air cleaner case body. The side surface is defined as a lid side of the element guard assembly. The seal wall is provided at the side surface to provide a seal between the resin air cleaner element and the air cleaner case body while positioning the resin air cleaner element.

18 Claims, 10 Drawing Sheets

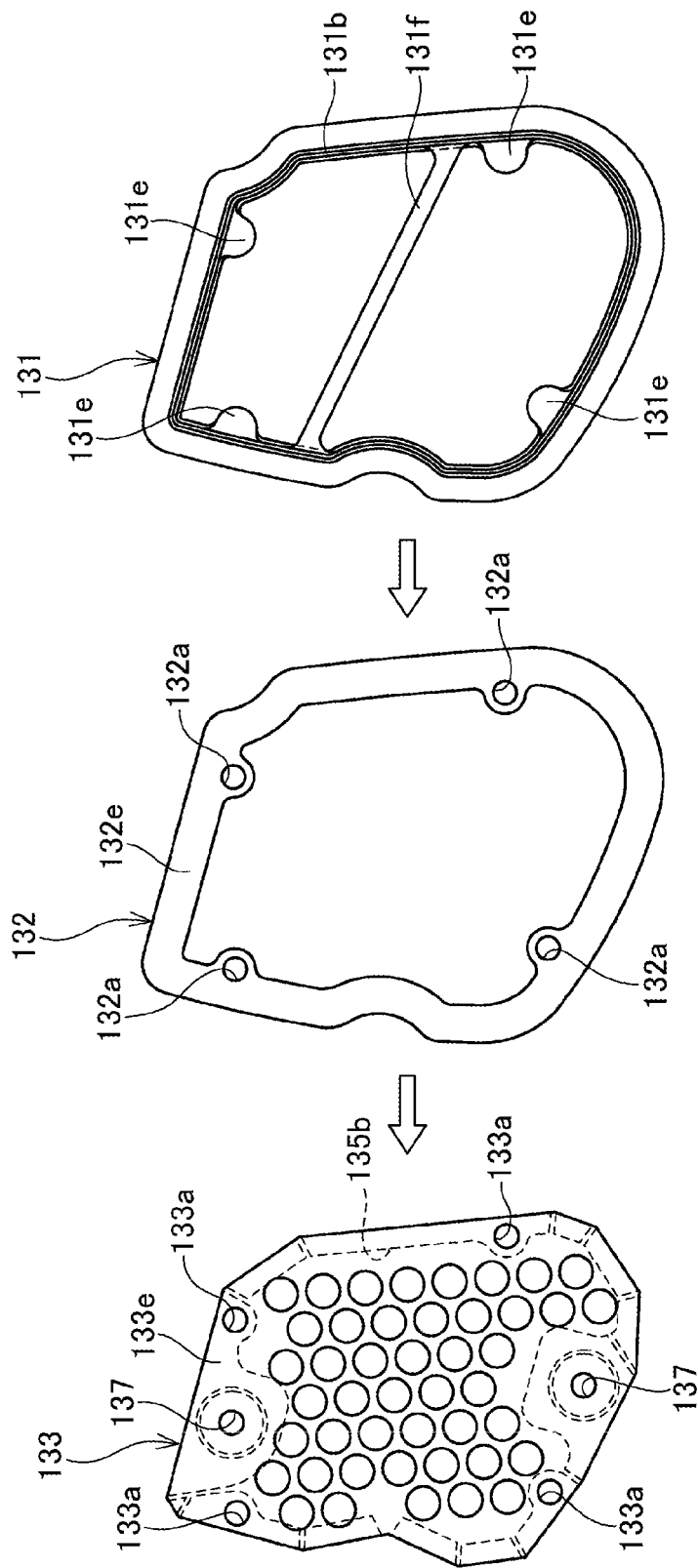

AIR CLEANER DEVICE FOR VEHICLE

CROSS-REFERENCE TO RELATED APPLICATIONS

The present application claims priority under 35 U.S.C. §119 to Japanese Patent Application No. 2012-019109, filed Jan. 31, 2012. The contents of this application are incorporated herein by reference in their entirety.

BACKGROUND OF THE INVENTION

1. Field of the Invention

The present invention relates to an air cleaner device for a vehicle.

2. Discussion of the Background

As an air cleaner device for a vehicle, there is known an air cleaner device in which an air cleaner case is composed of a body-box and a lid member, and an element is interposed by and positionedly fixed to the body-box and the lid member (for example, refer to JP-A No. 2001-221113).

The body-box is provided with an element housing portion which houses the element and is provided with an annular step portion around a peripheral edge portion thereof. The element is interposed by the step portion and a peripheral edge portion of the lid member.

SUMMARY OF THE INVENTION

According to one aspect of the present invention, an air cleaner device for a vehicle includes an air cleaner case body, a lid, a resin air cleaner element, and an element guard assembly. The air cleaner case body includes a peripheral wall defining an opening portion. The lid is connected with the air cleaner case body. The resin air cleaner element is provided between the air cleaner case body and the lid to be held by the air cleaner case body and the lid. The element guard assembly is provided inside the peripheral wall of the air cleaner case body. The element guard assembly includes a periphery, a side surface, and a seal wall. The periphery of the element guard assembly contacts a part of the peripheral wall of the air cleaner case body. The side surface is defined as a lid side of the element guard assembly. The seal wall is provided at the side surface to provide a seal between the resin air cleaner element and the air cleaner case body while positioning the resin air cleaner element.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIGS. 8A to 8C are operation views for explaining assembling of the element guard assembly.

DESCRIPTION OF THE EMBODIMENTS

Figure 1:
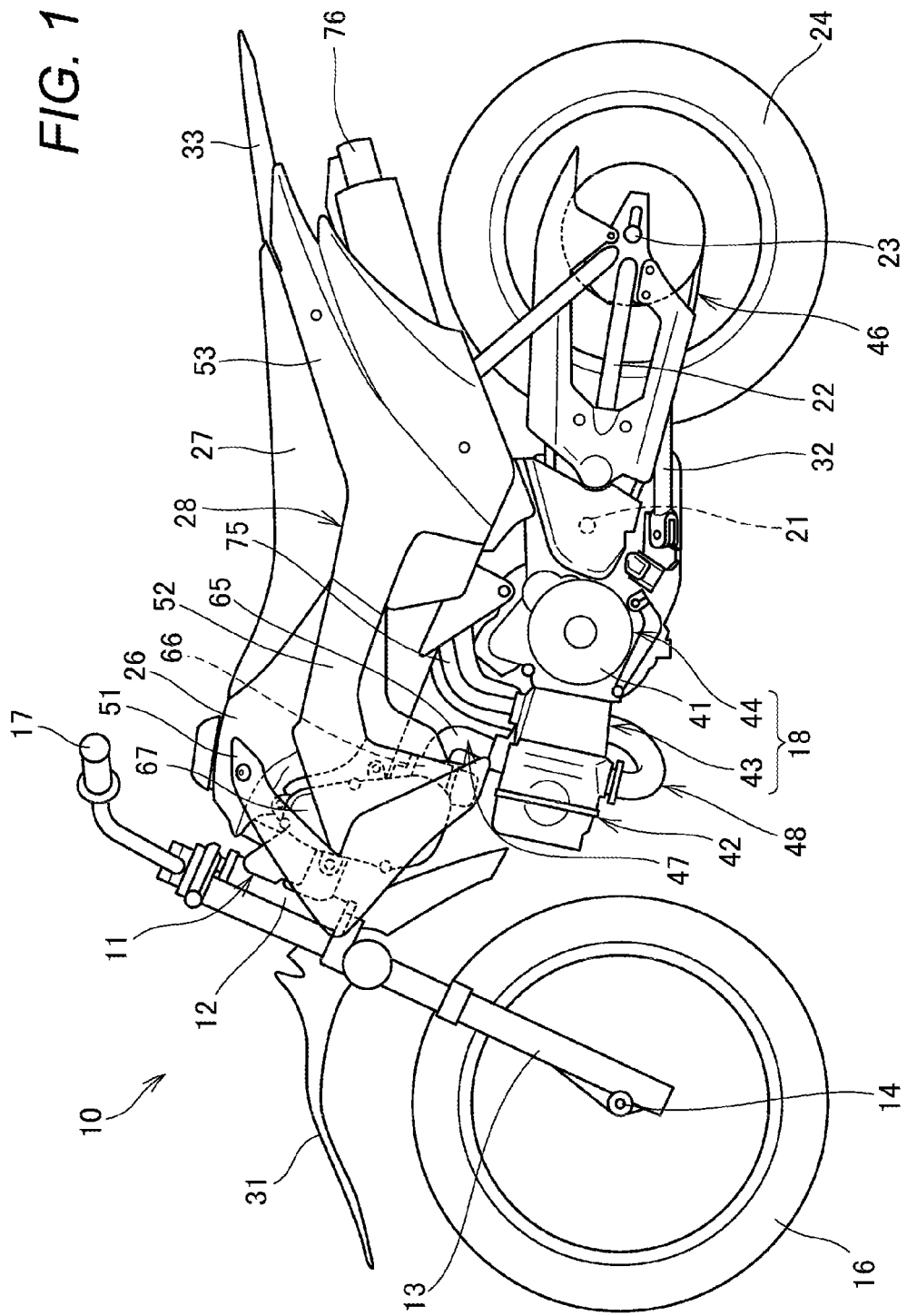
FIG. 1 is a left side view which shows a motorcycle provided with an air cleaner device according to an embodiment.

The embodiments will now be described with reference to the accompanying drawings, wherein like reference numerals designate corresponding or identical elements throughout the various drawings.

Incidentally, the directions "front", "rear", "left", "right" "upper" and "lower" referred to in the following description shall be identical with directions with respect to a vehicle body unless otherwise specified. Moreover, reference sign "FR" shown in each figure denotes a forward direction of the vehicle body, reference sign "UP" denotes an upward direction of the vehicle body, and reference sign "LE" denotes a left direction of the vehicle body.

FIG. 1 is a left side view which illustrates a motorcycle 10 provided with an air cleaner device 67 according to the embodiment.

The motorcycle 10 is a saddle-ride vehicle which includes, as main components, a vehicle body frame 11 serving as a framework, a front fork 13 mounted to a headpipe 12 so as to be steerable in a left-right direction, the headpipe 12 constituting a front end portion of the vehicle body frame 11, a front wheel 16 attached to a lower end of the front fork 13 via an axle 14, a handlebar 17 attached to an upper end of the front fork 13, a power unit 18 attached to a lower portion of the vehicle body frame 11, a swing arm 22 mounted via a pivot shaft 21 to the lower portion of the vehicle body frame 11 so as to be vertically swingable, a rear wheel 24 attached to a rear end portion of the swing arm 22 via an axle 23, a fuel tank 26 and a seat 27 which are attached on an upper portion of the vehicle body frame 11 so as to line up in front and behind, and a vehicle body cover 28 covering the upper portion of the vehicle body frame 11 from a lateral direction.

Incidentally, reference sign 31 denotes a front fender covering the front wheel 16 from an upward direction, reference sign 32 denotes a side stand, and reference sign 33 designates a rear fender covering the rear wheel 24 from the upward direction.

The power unit 18 includes an engine 43, in which a cylinder portion 42 is provided so as to extend substantially forward from a crankcase 41, and a transmission 44 integrally provided at a rear portion of the engine 43. Power is transmitted to the rear wheel 24 from an output shaft of the transmission 44 via a chain transmission mechanism 46.

The cylinder portion 42 of the engine 43 is connected at an upper portion thereof to an intake system 47 and connected at a lower portion thereof to an exhaust system 48.

The vehicle body cover 28 includes a pair of left and right front-shrouds 51, 51 of L-shapes as viewed in the side view (only reference sign 51 on the near side is shown) covering rear portions of the left and right of the upper portion of the front fork 13, a pair of left and right front-side covers 52, 52 extending rearward at lateral portions of a lower portion of the fuel tank 26 so as to continue on the front shrouds 51, 51, and a pair of left and right rear-side covers 53, 53 extending rearward at lower portions of the left and right of the seat 27 so as to continue on the front side-covers 52, 52.

Figure 2:
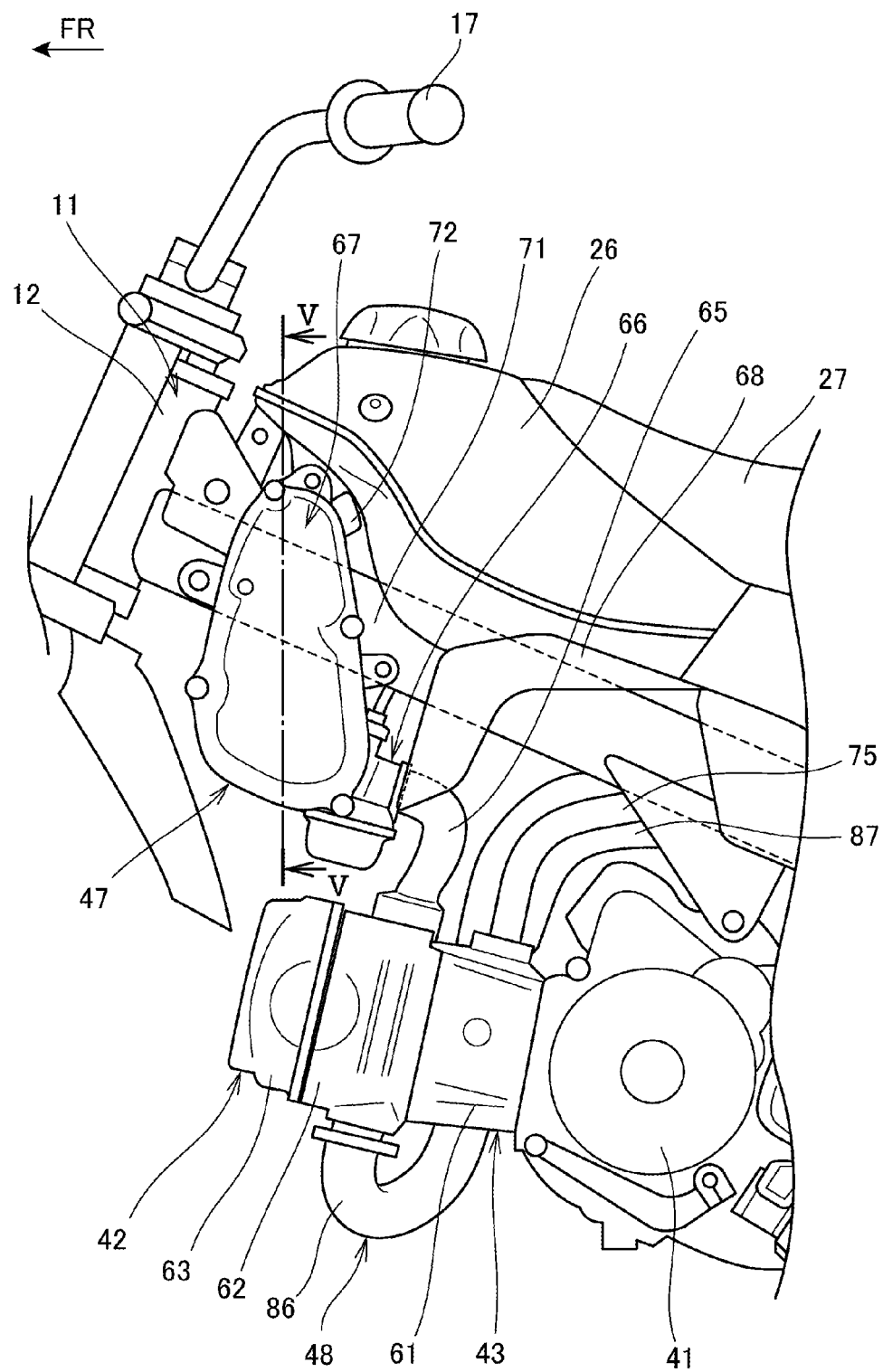
FIG. 2 is a left side view illustrating an essential part of the motorcycle.

FIG. 2 is a left side view illustrating an essential part of the motorcycle 10.

The cylinder portion 42 of the engine 43 is provided with a cylinder block 61 attached to a front end of the crankcase 41, a cylinder head 62 attached to a front end of the cylinder block 61, and a head cover 63 covering a front end opening portion of the cylinder head 62.

The intake system 47 includes an intake pipe 65 connected to an intake port opened in an upper portion of the cylinder head 62, a carburetor 66 connected to a tip end portion of the intake pipe 65, and the air cleaner device 67 connected to the carburetor 66 via a connecting tube (not shown). Incidentally, reference sign 68 denotes a support member which is attached to the lower portion of the fuel tank 26 in order to support the air cleaner device 67.

The air cleaner device 67 is vertically longitudinal and provided at an upper end thereof with a tubular air-intake port 72 which extends between a main frame 71 (which is one of the components of the vehicle body frame 11) extending rearward and obliquely downward from the headpipe 12, and the fuel tank 26, and whose tip end is opened. Maintenance of an air cleaner element (not shown) can be performed from the left side direction of the vehicle body (the near side in the front-back direction of the sheet of the drawing).

The exhaust system 48 includes an exhaust pipe 75, which is connected to an exhaust port opened in a lower portion of the cylinder head 62 and extends rearward with respect to the vehicle body on the right side of the vehicle body, and a muffler 76 (refer to FIG. 1) connected to a rear end portion of the exhaust pipe 75.

Figure 3:
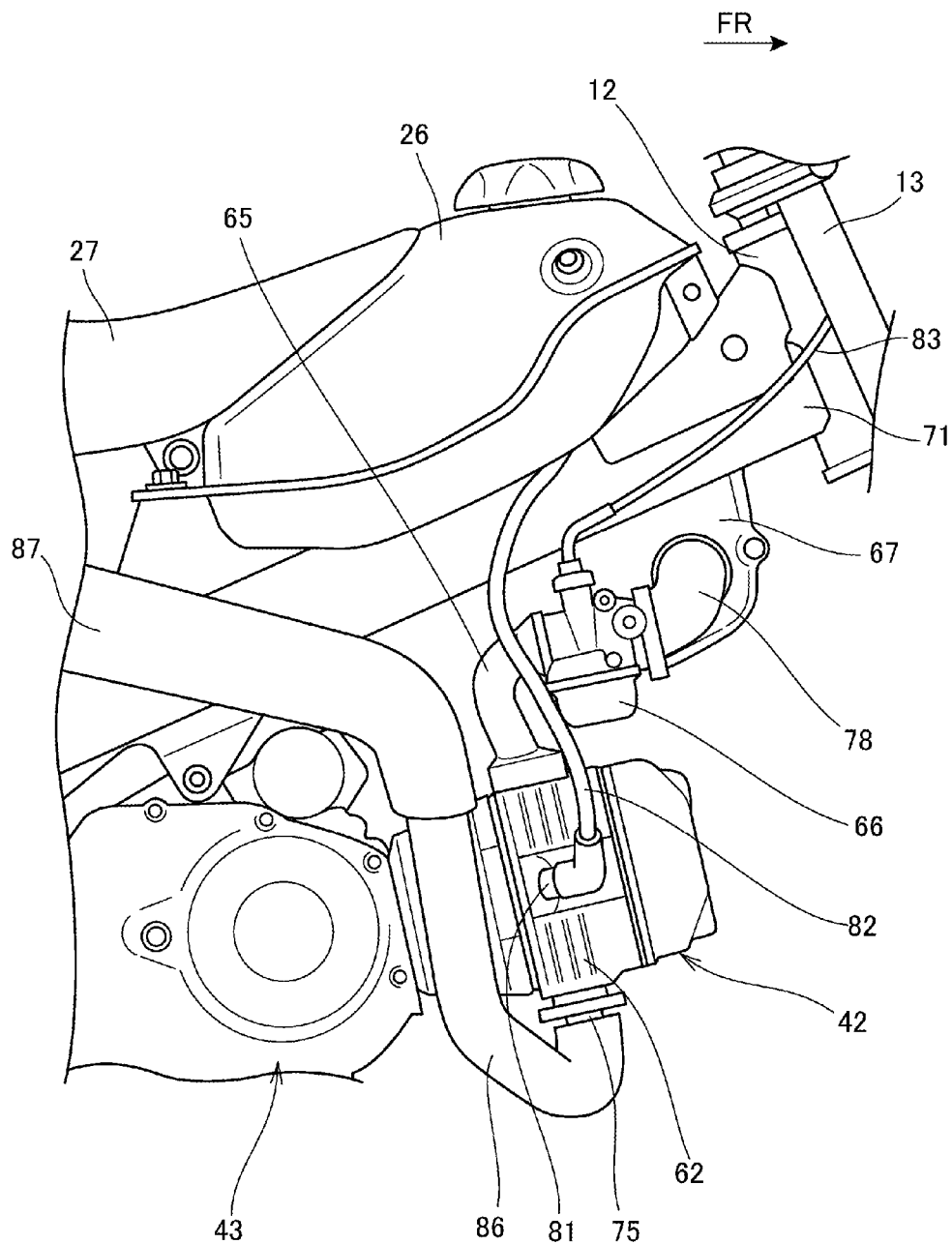
FIG. 3 is a right side view illustrating the essential part of the motorcycle.

FIG. 3 is a right side view illustrating the essential part of the motorcycle 10.

The intake pipe 65 which extends upward and is bent forward is connected to the upper portion of the cylinder head 62 of the engine 43. The carburetor 66 is connected to a front portion of an upper end portion of the intake pipe 65. The connecting tube 78 is connected to a front portion of the carburetor 66. The air cleaner device 67 is connected to the connecting tube 78.

The carburetor 66 is arranged lower relative to the main frame 71. In the carburetor 66, a main air-passage is formed so as to extend in the forward-rearward direction of the vehicle body. The intake pipe 65 and the connecting tube 78 communicate with both end portions of the main air-passage. Air passes through the connecting tube 78 from the air cleaner device 67 and is supplied to the carburetor 66 in which the air is mixed with fuel. The air-fuel mixture passes through the intake pipe 65 from the carburetor 66 and flows into the cylinder head 62. Incidentally, reference sign 81 denotes a spark plug attached to the cylinder head 62, reference sign 82 designates a plug cord connected to the spark plug 81, and reference sign 83 denotes a throttle cable connected to the carburetor 66.

The exhaust pipe 75 is connected to the lower portion of the cylinder head 62. The exhaust pipe 75 passes downward and right side of the cylinder portion 42, extends upward, and further extends rearward and obliquely upward. Incidentally, reference sign 86 denotes an exhaust pipe cover placed on a lower portion of the exhaust pipe 75, and reference sign 87 designates a heat shield cover covering a lateral portion of an upper portion of the exhaust pipe 75.

Figure 4:
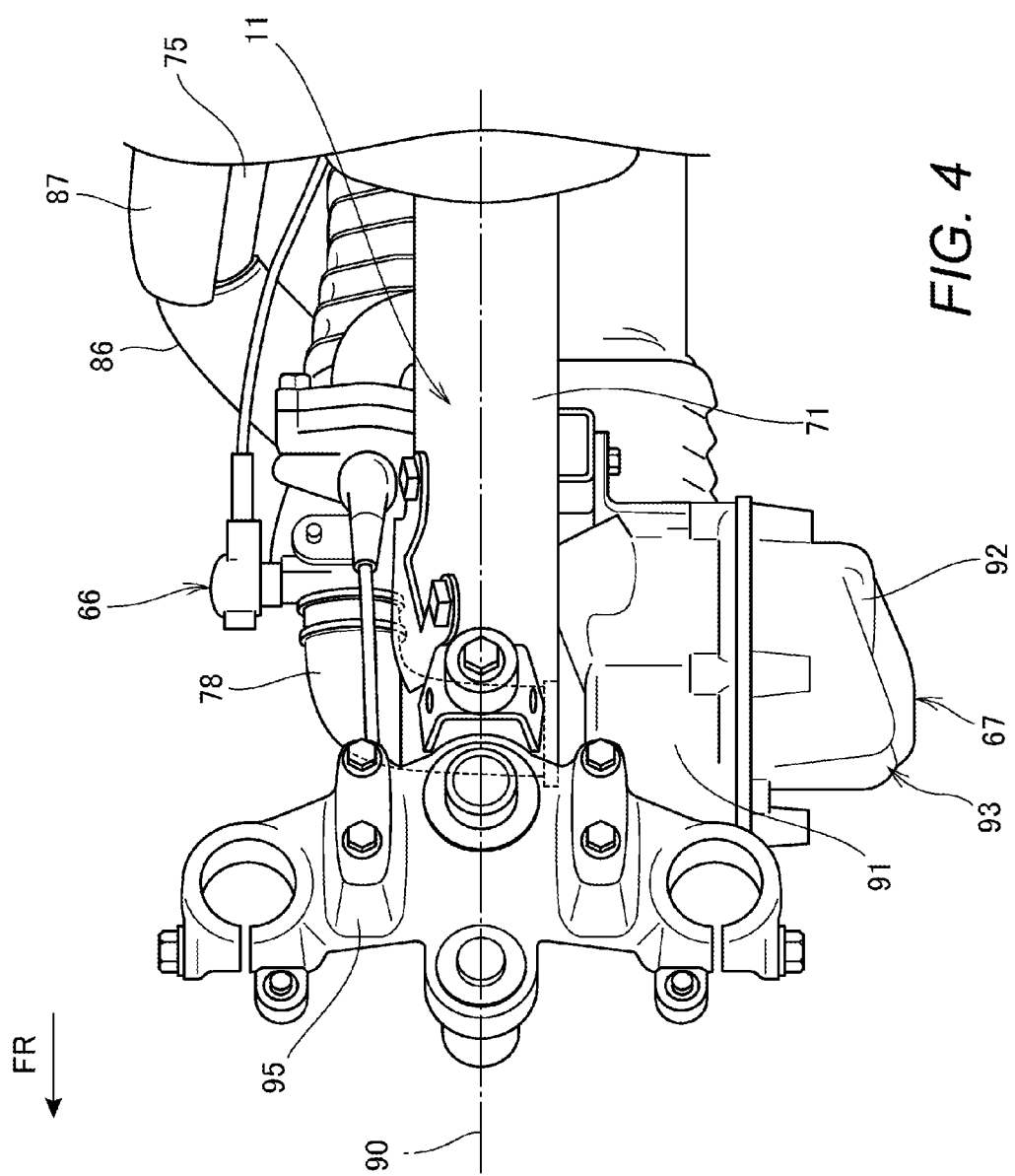
FIG. 4 is a plane view showing the essential part of the motorcycle.

FIG. 4 is a plane view showing the essential part of the motorcycle.

The main frame 71 extends in the forward-rearward direction of the vehicle body so as to overlap on a vehicle body center line 90 which passes a center in a vehicle width direction and extends in the forward-rearward direction of the vehicle body. The air cleaner device 67 is arranged on the left side of the vehicle body center line 90. The carburetor 66 is arranged on the right side of the vehicle body center line 90. The connecting tube 78 extends to a side portion of the air cleaner device 67 from a front portion of the carburetor 66 in such a manner that it is bent with its direction being varied to a substantially right angle.

The air cleaner device 67 is provided with an air cleaner case 93 which is composed of a case body 91 attached to a vehicle body frame 11 side and a case cover 92 detachably mounted to a left side portion of the case body 91. Incidentally, reference sign 95 denotes a top bridge constituting the front fork 13.

Figure 5:
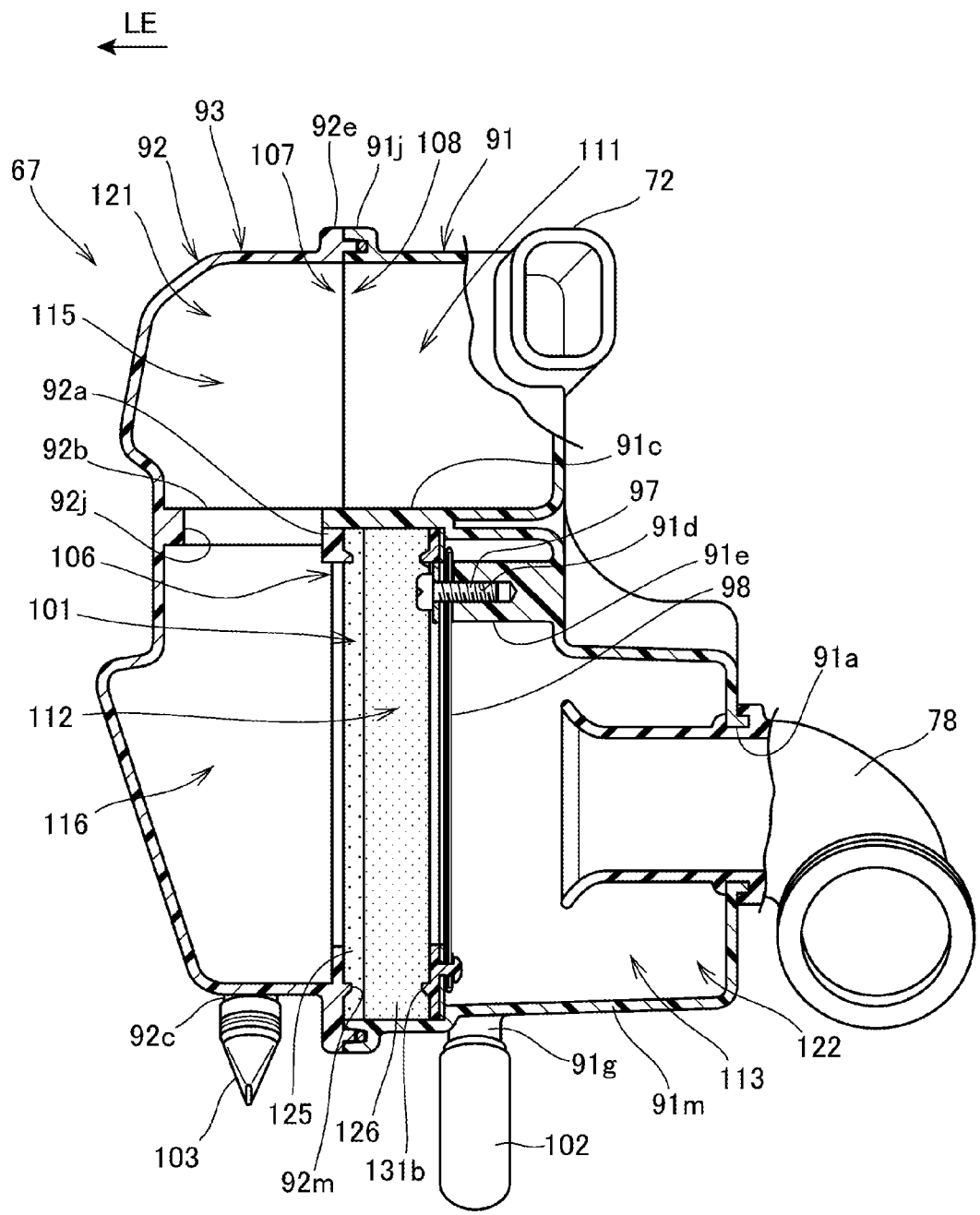
FIG. 5 is a sectional view, taken along line V-V in FIG. 2.

FIG. 5 is a sectional view taken along line V-V in FIG. 2.

The air cleaner device 67 comprises the air cleaner case 93 composed of the case body 91 and the case cover 92, an element guard assembly 98 attached to the case body 91 by a plurality of screws 97, an air cleaner element 101 provided between the element guard assembly 98 and the case cover 92 to be held by the element guard assembly 98 and the case cover 92, and drain hoses 102, 103 for discharging out water, oil content, etc. accumulated at respective bottoms of the case body 91 and case cover 92.

The case body 91 is formed with the air intake port 72 formed in a corner portion of an upper portion thereof, a tube connection port 91a to which the connecting tube 78 is connected, a peripheral wall 91c defining an opening portion 106 in which the element guard assembly 98 and the air cleaner element 101 are housed, a plurality of boss portions 91e formed with internal threads 91d to which the plurality of screws 97 are threadedly connected, a drain tube portion 91g to which the drain hose 102 is connected, and a body side installing portion 91j formed at a peripheral edge of an opening portion 107 opened in a case cover 92 side in such a manner that the case cover 92 is allowed to be installed. The case body 91 are divided into a first body-room 111 communicating with the air intake port 72, a second body-room 112 in which the air cleaner element 101 is housed, and a third body-room 113 which is adjacent with respect to the second body-room 112 through the element guard assembly 98 and in which one end of the connecting tube 78 is opened. Incidentally, reference sign 91m denotes an outer wall including a part of the peripheral wall 91c.

The case cover 92 is formed with a frame-shaped pressing-portion 92a pressing the air cleaner element 101, a wall-shaped support wall 92bb supporting the frame-shaped pressing-portion 92a, a drain tube portion 92c to which the drain hose 103 is connected, and a cover side installing-portion 92e which is formed around a peripheral edge of an opening portion 108 opened in the case body 91 side so as to be installed to the body side installing portion 91j of the case body 91. By the support wall 92bb, a first cover-room 115 adjacent to and communicating with the first body-room 111 of the case body 91 and a second cover-room 116 adjacent to and communicating with the second body-room 112 of the case body 91 are defined. Incidentally, reference sign 92j denotes a vent hole opened in the support wall 92b. Via the vent hole 92j, air flows between the first cover-room 115 and the second cover-room 116.

The first body-room 111, the first cover-room 115, and the second cover-room 116 which have been discussed above are a dirty side 121 which serves as a room prior to purification of air in the air cleaner element 101. The third body-room 113 is a clean side 122 which serves as a room after the purification of the air in the air cleaner element 101.

The functions of the element guard assembly 98 reside in (1) preventing (extinguishing) backfire blowing back from a combustion chamber of the engine to the intake system side to protect the air cleaner element 101, (2) positioning the air cleaner element 101 in a fixed location to retain it, and (3) sealing the air cleaner element 101 and the case body 91 in such a manner that air is not leaked between the air cleaner element 101 and the case body 91. In order that the element guard assembly 98 exerts such functions, the element guard assembly 98 has a structure in which the plurality of parts are laminated as detailedly shown in FIGS. 6 and 7.

The air cleaner element 101 is a component in which a first coarse element 125 arranged on the dirty side 121 side, and a second element 126 finer than the first element 125 and arranged on the clean side 122 side are bonded together. Both the first element 125 and the second element 126 are urethane-made. The second element 126 is made thicker than the first element 125.

Figure 6:
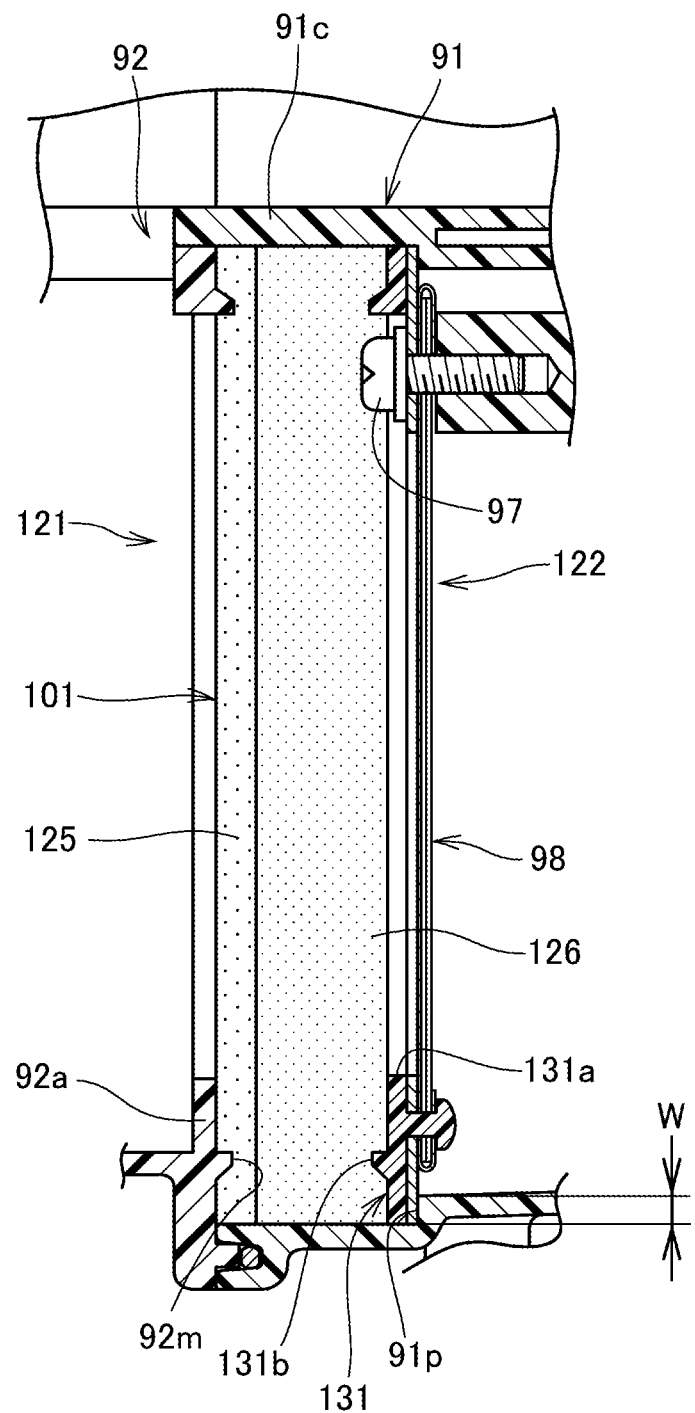
FIG. 6 is a sectional view illustrating an essential part of the air cleaner device.

FIG. 6 is a sectional view illustrating the essential part of the air cleaner device 67.

A step portion 91p is formed at the peripheral wall 91c of the case body 91. The peripheral edge portion of the element guard assembly 98 is applied to the step portion 91p and the element guard assembly 98 is attached to the case body 91 by the plurality of screws 97.

The element guard assembly 98 is provided with a resin element guard holder 131 on the air cleaner element 101 side. The element guard holder 131 is formed with an endless-shaped protrusion 131b around the entire periphery of an edge portion of an opening portion 131 thereof, the protrusion 131b projecting toward the air cleaner element 101 side.

Moreover, the case cover 92 is formed with an endless-shaped protrusion 92m around the entire periphery of an inner edge portion of the frame-shaped pressing portion 92a thereof, the protrusion 92m projecting toward the air cleaner element 101 side.

In the state where the case cover 92 is installed to the case body 91 as shown in FIGS. 5 and 6, the air cleaner element 101 is interposed between and held down by the protrusion 131b of the case body 91 and the protrusion 92m of the case cover 92 and positioned and retained so as not to be shifted on surfaces which extend in a vertical direction and front-back direction of the sheet of each of the drawings.

The protrusion 92m is bitten into and stuck to the first element 125 and the protrusion 131b is bitten into and stuck to the second element 126, so that an interval between the protrusion 92m and the first element 125 and an interval between the protrusion 131b and the second element 126 are sealed and flow of air into the intervals is prevented. For example, even if a clearance between the peripheral wall 91c of the case body 91 and the air cleaner element 101 is present, air can be prevented from passing the clearance and leaking from the opening portion 131a of the element guard holder 131 to the cleaner side 122 side.

The provision of the protrusions 92m, 131b in this way makes it possible to prevent the air from flowing from the dirty side 121 to the clean side 122 not through the air cleaner element 101, and to enhance air purification performance.

A width of the step portion 91p to which the peripheral portion of the element guard assembly 98 is applied is designated by W. In the past, a protrusion is also provided at a step portion which is provided at a case body in order to position an air cleaner element. Therefore, an outer wall of the case body is provided more inside relative to a position of the protrusion, so that a width of the step portion is increased. In this embodiment, the width W of the step portion 91p becomes smaller than that of the existing step portion and the outer wall 91m of the third body-room 113 of the case body 91 is provided more outside. Therefore, in this embodiment, it is possible to obtain a volume of the clean side 122 which is made large by the smallness of the width W of the step portion 91p, as compared with a volume of a existing clean side.

Figure 7A:
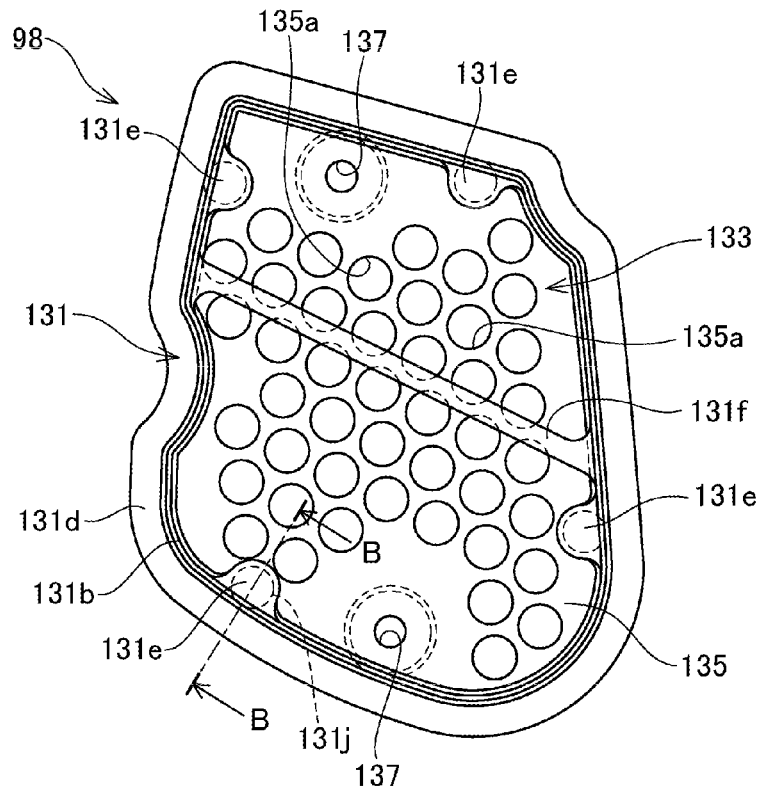
FIGS. 7A and 7B are explanatory views illustrating an element guard assembly.
Figure 7B:
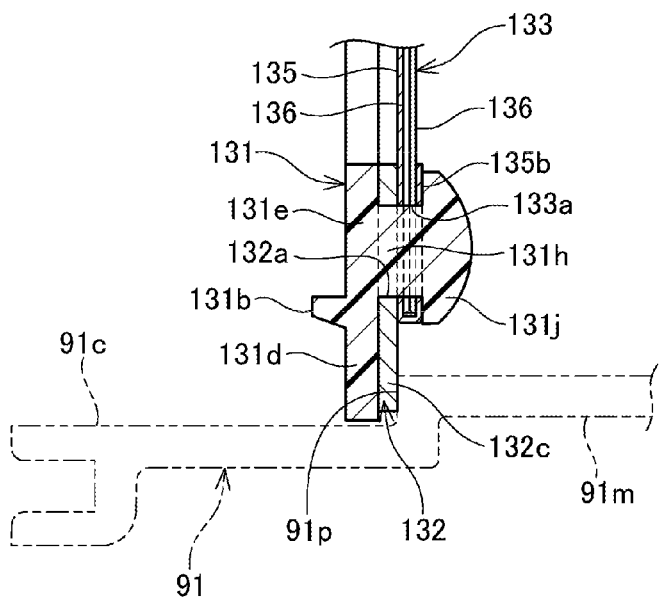

FIGS. 7A and 7B are explanatory views illustrating the element guard assembly 98. FIG. 7A is a front view of the element guard assembly and FIG. 7B is a sectional view, taken along line B-B in FIG. 7A.

As shown in FIGS. 7A and 7B, the element guard assembly 98 includes the element guard holder 131, a steel frame-shaped plate 132 overlapped on the element guard holder 131, and an element guard body 133 whose outer peripheral portion is applied to the frame-shaped plate 132. The element guard holder 131, the frame-shaped plate 132, and the element guard body 133 are integrated together by welding-formation, molding-formation, etc.

The element guard holder 131 includes a substantially rectangular-shaped frame portion 131d, the protrusion 131b formed along an inner edge portion of the frame portion 131d, a plurality of semicircular-shaped, inward protruding portions 131e formed at the inner edge portion of the frame portion 131d so as to protrude from the inner edge portion of the frame portion 131d, and a bridge portion 131f bridged at a substantially center of the frame portion 131d.

The inward protruding portion 131e is integrally provided at a back surface thereof with a hole-filling portion 131h, which is inserted into a mounting hole 132a of the frame-shaped plate 132 and a mounting hole 133a of the element guard body 133, and a head portion 131j formed at a tip end of the hole-filling portion 131h and preventing the element guard body 133 from coming out of the hole-filling portion 131h.

The frame-shaped plate 132 is a component reinforcing the element guard holder 131, and more reduces deflection of the element guard holder 131, and prevents lowering of the sealing property of the protrusion 131b of the element guard holder 131. The frame-shaped plate 132 is applied at the outer peripheral edge portion 132c thereof to the step portion 91p of the case body 91.

The element guard body 133 includes a steel holed-plate 135 for reinforcement, in which a plurality of round holes 135e are formed, and two metallic net-shaped members 136, 136 whose peripheries are fixed by a bent portion 135b of a bent edge portion of the holed plate 135. Meshes of the net-shaped member 136 become smaller than the round holes 135a of the holed plate 135. Incidentally, reference sign 137 denotes screw insertion holes which are formed in the element guard body 133 and into which the screws 97 are inserted when the element guard assembly 98 is installed to the case body 91.

The operation of the air cleaner device 67 structured as discussed above will be then explained.

FIGS. 8A to 8C are operation views for explaining the assembling of the element guard assembly 98.

An assembling manner of the element guard assembly 98 will be hereinafter explained in due course.

First, a back surface of the frame-shaped plate 132 is combined with a front surface 133e of the element guard body 133 in such a manner that corresponding mounting-holes 132a and mounting holes 133a are coincided with one another. Next, a back surface of the element guard holder 131 is combined with a front surface 132e of the frame-shaped plate 132 in such a manner that corresponding mounting-holes 132a and the inward protruding portions 131e are coincided with one another.

Then, pouring of molten resin into the mounting holes 133a and the mounting holes 132a is performed while maintaining a positional relationship among the above-mentioned three components. The molten resin and the inward protruding portions 131e of the element guard holder 131 are melt-bonded and the head portion 131j (refer to FIG. 7B) is formed on the element guard body 133 with the molten resin which is then solidified. Thereby, the element guard holder 131, the frame-shaped plate 132, and the element guard body 133 are bonded together as shown in FIG. 7B to form the element guard assembly 98 (refer to FIG. 7A).

Moreover, as an assembling manner different from the above-mentioned assembling manner, the frame-shaped plate 132 and the element guard body 133 are placed in a mold after they are aligned, and molten resin is poured into the mold, whereby the element guard holder 131 which is provided with the hole-filling portion 131h (refer to FIG. 7B) and the head portion 131j (refer to FIG. 7B) is formed by the molten resin, and the element guard assembly 98 in which the frame-shaped plate 132 and the element guard body 133 are bonded to the element guard holder 131 is assembled.

Figure 9:
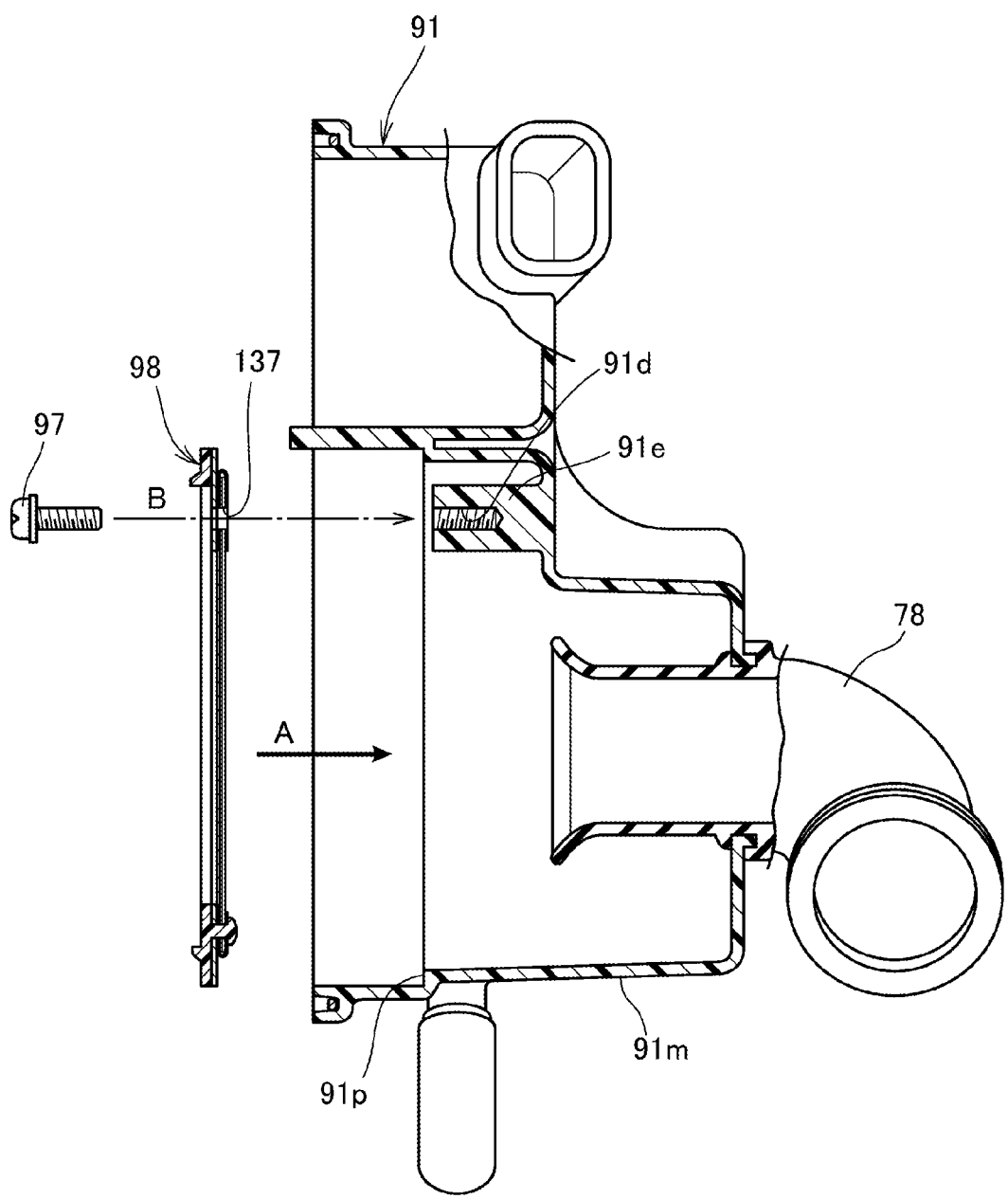
FIG. 9 is an operation view illustrating an installing manner of the element guard assembly.

FIG. 9 is an operation view illustrating an installing manner of the element guard assembly 98.

In order to install the element guard assembly 98 to the case body 91, the element guard assembly 98 is first applied to the step portion 91p of the case body 91 as indicated by an arrow A. Then, as indicated by an arrow B, the screws 97 are inserted into the screw insertion holes 137 of the element guard assembly 98 and threaded into the internal threads 91d formed in the boss portions 91e. Thereby, the element guard assembly 98 is fastened to the case body 91.

Figure 10:
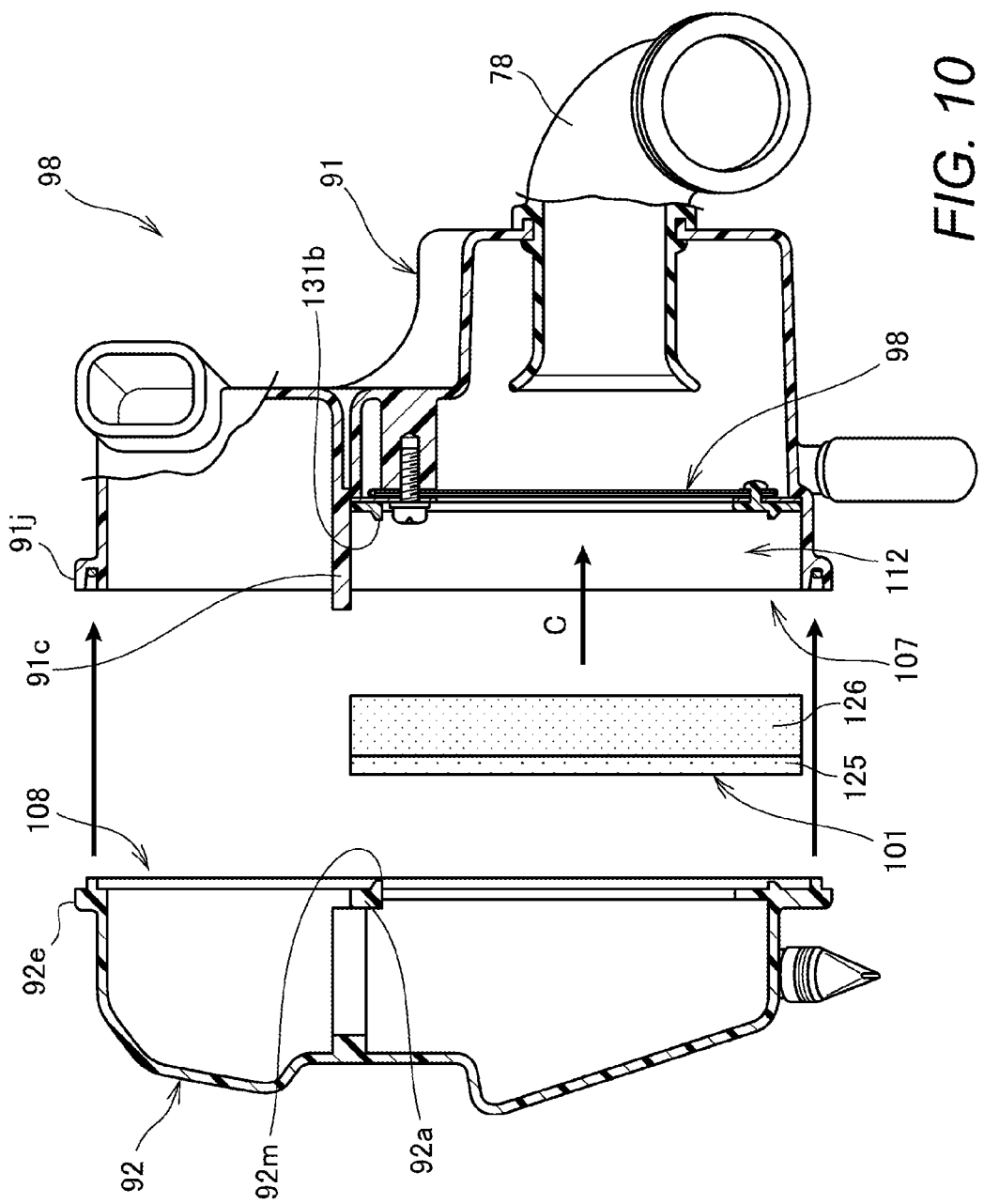
FIG. 10 is an operation view illustrating an installing manner of an air cleaner element.

FIG. 10 is an operation view illustrating an installing manner of the air cleaner element 101.

In order to install the air cleaner element 101 to the case body 91 at the time of, for example, maintenance, the air cleaner element 101 is first inserted into the second body-room 112 surrounded by the peripheral wall 91c of the case body 91, as indicated by an arrow C. Next, the cover side installing portion 92e which is provided around the peripheral edge of the opening portion 108 of the case cover 92 is fitted in the body side installing portion 91j provided around the peripheral edge of the opening portion 107 of the case body 91 and, moreover, the case cover 92 is fastened to the case body 91 by a plurality of unshown screws. Consequently, as shown in FIG. 5, the air cleaner element 101 is provided between the protrusion 131b of the element guard assembly 98 and the protrusion 92m of the case cover 92 to be held by the protrusion 131b and the protrusion 92m. Thus, the installing of the air cleaner element 101 is completed.

As shown in FIGS. 1, 5 and 6, in the air cleaner device 67 for the motorcycle 10, in which the urethane air cleaner element 101 is provided between the case body (air cleaner case body) 91 and the case cover (lid) 92 combined with the case body 91 to be held by the case body (air cleaner case body) 91 and the case cover (lid) 92, the air cleaner device 67 is provided with the element guard assembly 98 which prevents the backfire and is provided inside the peripheral wall 91c of the case body 91, which defines the opening portion 106 of the case body 91 which is put together with the case cover 92, in such a manner that a periphery thereof contacts the step portion (part) 91p of the peripheral wall 91c of the case body 91, and the protrusion (seal wall) 131b which provides a seal between the air cleaner element 101 and the case body 91 while positioning the air cleaner element 101 and which is provided at a side surface defined as the case cover 92 side of the element guard assembly 98.

According to this structure, the backfire is prevented by the element guard assembly 98 and, moreover, the protrusion 131b of the element guard assembly 98 closes the clearance between the air cleaner element 101 and the case body 91 so as not to allow intake-air to leak from the clearance and can position the air cleaner element 101. In the past, it is obliged to arrange a part of an outer wall of an air cleaner case body inward of the air cleaner case body in order to provide a seal wall at the air cleaner case body, to thereby reduce a volume of an air cleaner case. However, according to the embodiment, the protrusion 131b which serves as a seal wall and a positioning wall is provided at the element guard assembly 98 as a member formed separately from the case body 91, whereby the outer wall 91m of the case body 91 is arranged more outward and it is possible to obtain the volume of the air cleaner case 93, to enhance air purification performance, and to realize more reduction of the intake noise and improvement of engine performance.

Moreover, as shown in FIGS. 5 and 9, the element guard assembly 98 is detachably mounted to the case body 91, so that when the case cover 92 is removed and only the air cleaner element 101 is detached in a case of performing the maintenance of the air cleaner device 67 from a lateral direction of the vehicle body, the element guard assembly 98 will not drop, the attaching and detaching of the air cleaner element 101 can be easily performed, and maintainability can be improved.

Moreover, as shown in FIGS. 1, 2, 4, and 5, the air cleaner device 67 is arranged laterally of the main frame 71 extending rearward from the headpipe 12 in the motorcycle (saddle-ride vehicle) 10 along the vehicle body center, and the air cleaner element 101 which is flatly formed is arranged in such a manner that one of the front and back surfaces thereof faces outward of the vehicle body, so that when the maintenance of the air cleaner device 67 is performed from the lateral direction of the vehicle body, the case cover 92 is detached and it is possible to easily perform the attaching and detaching of the flat air cleaner element 101 and to improve the maintainability.

Moreover, as shown in FIGS. 2 and 5, the air cleaner device 67 is formed at the case body 91 thereof with the air intake port 72 taking in air from the outside, the first body-room (intake duct room) 111 communicating with the air intake port 72, and the second body-room (element room) 112 in which the air cleaner element 101 is housed. The air intake port 72 extends between the main frame 71 and the fuel tank 26 provided at the upper portion of the main frame 71 and is opened at the tip end thereof. Therefore, the air intake port 72 extends to a center side in the vehicle width direction and opened, whereby it is not projected in the forward-rearward direction of the vehicle body and it is possible to obtain the volume of the air cleaner case 93 while allowing a width of the air cleaner device 67 in the forward-rearward direction of the vehicle body to be reduced, and to easily perform the maintenance of the air cleaner element 101 by detaching the case cover 92.

Moreover, as shown in FIGS. 7A to 8C, in the element guard assembly 98, the metallic plate-shaped element-guard-body 133, which is formed by causing the holed-plate (reinforcing plate) 135 in which the round holes 135a larger than the meshes of the net-shaped members (fine mesh plates) 136 are formed, to be overlapped on the net-shaped members 136, and the frame-shaped element guard holder (resin plate) 131 which is formed at the side surface of the outer peripheral portion thereof with the protrusion 131b, are integrally overlapped with one another together with the frame-shaped plate 132 and bonded to one another, so that the element guard assembly 98 prevents the backfire and becomes a single component having the function of providing the seal while positioning the air cleaner element 101, and handling such as the attaching, detaching, etc. of the element guard assembly 98 is made easy.

Moreover, as shown in FIGS. 1, 3, and 4, the motorcycle 10 is provided with the engine 43 arranged downward of the main frame 71, in which the cylinder portion 42 substantially horizontally extends forward from the crankcase 41 and, upward of the cylinder portion 42, the carburetor 66 is arranged on one side (right side) and the air cleaner device 67 is arranged the other side (right side), so that the air cleaner device 67 can be effectively protected from the backfire from the engine 43 by the element guard assembly 98 and, thus, it is possible to cause the air cleaner device 67 to be more adjacent to the engine 43 and to realize miniaturization of the motorcycle 10.

The above-mentioned embodiment has been explained just as one embodiment of the present invention and various changes and modification can be arbitrarily made without departing from the gist of the present invention.

For example, while in the above-mentioned embodiment, the air cleaner device 67 is applied to the motorcycle provided with the carburetor 66 at the intake system of the engine 43 as shown in FIG. 3, the present invention is not limited to this. The air cleaner device 67 may be applied to a motorcycle in which the intake system is provided with a throttle body in lieu of the carburetor 66.

In an air cleaner device for a vehicle according to the embodiment, a resin air cleaner element (101) is provided between an air cleaner case body (91) and a lid (92) combined with the air cleaner case body (91) to be held by the air cleaner case body (91) and the lid (92), wherein an element guard assembly (98) is provided inside a peripheral wall (91c) of the air cleaner case body (91), which defines an opening portion (106) which is put together with the lid (92), in such a manner that a periphery thereof contacts a part (91p) of the peripheral wall (91c) of the air cleaner case body (91), and a seal wall (131b) which provides a seal between the air cleaner element (101) and the air cleaner case body (91) while positioning the air cleaner element (101) is provided at a side surface defined as the lid (92) side of the element guard assembly (98).

According to this structure of the embodiment, backfire is prevented by the element guard assembly and, moreover, the seal wall of the element guard assembly closes a clearance between the air cleaner element and the air cleaner case body so as not to allow intake-air to leak from the clearance and can position the air cleaner element. In the past, it is obliged to arrange a part of an outer wall of an air cleaner case body inward of the air cleaner case body in order to provide a seal wall at the air cleaner case body, to thereby reduce a volume of an air cleaner case. However, according to the embodiment, the seal wall is provided at the element guard assembly as a member formed separately from the air cleaner case, whereby an outer wall of the air cleaner case body is arranged more outward and it is possible to obtain a volume of the air cleaner case, to enhance air purification performance, and realize more reduction of intake noise and improvement of engine performance.

In the above-mentioned structure of the embodiment, the element guard assembly (98) may be detachably mounted to the air cleaner case body (91). According to this structure, when the case cover is removed and only the air cleaner element is detached in a case of performing the maintenance of the air cleaner device from a lateral direction of a vehicle body, the element guard assembly will not drop, the attaching and detaching of the air cleaner element can be easily performed, and maintainability can be improved.

Moreover, in the above-mentioned structure of the embodiment, the air cleaner device (67) may be arranged laterally of a main frame (71) extending rearward from a headpipe (12) in a saddle-ride vehicle (10) along a vehicle body center, and the air cleaner element (101) may be flatly formed and arranged in such a manner that one of front and back surfaces thereof faces outward of a vehicle body. According to this structure, when the maintenance of the air cleaner device is performed from the lateral direction of the vehicle body, the lid is detached and it is possible to easily perform the attaching and detaching of the flat air cleaner element and to improve the maintainability.

Moreover, in the above-mentioned structure of the embodiment, the air cleaner device (67) may be formed at the air cleaner case body (91) thereof with an air intake port (72) taking in air from the outside, an intake duct room (111) communicating with the air intake port (72), and an element room (112) in which the air cleaner element (101) is housed, the air intake port (72) being opened between the main frame (71) and a fuel tank (26) provided at an upper portion of the main frame (71). According to this structure, the air intake port extends to a center side in a vehicle width direction and is opened, whereby it is not projected in the forward-rearward direction of the vehicle body and it is possible to obtain the volume of the air cleaner case while allowing a width of the air cleaner device in the forward-rearward direction of the vehicle body to be reduced, and to easily perform the maintenance of the air cleaner element by detaching the lid 92.

Moreover, in the above-mentioned structure of the embodiment, the element guard assembly (98) may be formed by causing a metallic plate-shaped element guard body (133) and a frame-shaped resin plate (131) to be integrally overlapped with and bonded to each other, the element guard body (133) being formed by causing cancellous fine-mesh plates (136) and a reinforcing plate (135) having holes (135a) larger than meshes of the fine mesh plates (136) to be overlapped with each other, and the frame-shaped resin plate (131) having the seal wall (131b) formed at a side surface of an outer peripheral portion thereof. According to this structure, the element guard assembly prevents backfire and becomes a single component having function of sealing the air cleaner element while positioning it, and handling such as attaching and detaching of the element guard assembly is made easy.

Moreover, in the above-mentioned structure of the embodiment, the saddle-ride vehicle (10) is provided with an engine (43) arranged downward of the main frame (71), in which a cylinder portion (42) substantially horizontally extends forward from a crankcase (41), a carburetor (66) may be arranged on one side and the air cleaner device (67) may be arranged the other side, upward of the cylinder portion. According to this structure, the air cleaner device can be effectively protected from the backfire from the engine by the element guard assembly and, thus, it is possible to cause the air cleaner device to be more adjacent to the engine and realize miniaturization of the saddle-ride vehicle.

According to the embodiment, the element guard assembly is provided inside the peripheral wall, defining the opening portion of the air cleaner case body and put together with the lid, in such a manner that the periphery thereof contacts the part of the peripheral wall of the air cleaner case body, and the side surface of the element guard assembly which defines the lid side is provided with the seal wall which provide the seal between the air cleaner element and the air cleaner case body while positioning the air cleaner element. Therefore, the backfire is prevented by the element guard assembly, a clearance between the air cleaner element and the air cleaner case body is closed by the seal wall of the element guard assembly so as not to allow intake air to be leaked from the clearance, and positioning of the air cleaner element can be performed. Moreover, the seal wall is provided at the element guard assembly as a member formed separately from the air cleaner case body, whereby it is possible to arrange an outer wall of the air cleaner case body more outward to obtain the volume of the air cleaner case, and it is possible to enhance the air purification performance and to realize more reduction of the intake noise and the improvement of the engine performance.

Moreover, according to the embodiment, the element guard assembly is detachably mounted to the air cleaner case body, so that when the lid is removed and only the air cleaner element is detached in a case of performing the maintenance of the air cleaner device from the lateral direction of the vehicle body, the element guard assembly will not drop, the attaching and detaching of the air cleaner element can be easily performed, and the maintainability can be improved.

Moreover, according to the embodiment, the air cleaner device is arranged laterally of the main frame extending rearward from the headpipe in the saddle-ride vehicle along the vehicle body center, and the air cleaner element which is flatly formed is arranged in such a manner that one of the front and back surfaces thereof faces outward of the vehicle body, so that when the maintenance of the air cleaner device is performed from the lateral direction of the vehicle body, the lid is detached and it is possible to easily perform the attaching and detaching of the flat air cleaner element and to improve the maintainability.

Moreover, the air cleaner device is formed at the air cleaner case body thereof with the air intake port taking in air from the outside, the intake duct room communicating with the air intake port, and the element room in which the air cleaner element is housed, and the air intake port is opened between the main frame and the fuel tank provided at the upper portion of the main frame, so that the air intake port extends to a center side in the vehicle width direction and is opened, whereby it is not projected in the forward-rearward direction of the vehicle body and it is possible to obtain an air cleaner volume while allowing the width of the air cleaner device in the forward-rearward direction of the vehicle body to be reduced, and to easily perform the maintenance of the air cleaner element by detaching the lid.

Moreover, according to the embodiment, the element guard assembly is formed by causing the metallic plate-shaped element guard body (133) and the frame-shaped resin plate to be integrally overlapped with and bonded to each other, the element guard body being formed by causing the cancellous fine-mesh plates and the reinforcing plate having holes larger than meshes of the fine mesh plates to be overlapped with each other, and the frame-shaped resin plate having the seal wall formed at the side surface of the outer peripheral portion thereof, so that the element guard assembly prevents the backfire and becomes the single component having the function of sealing the air cleaner element while positioning it, and the handling such as attaching and detaching of the element guard assembly is made easy.

Moreover, according to the embodiment, the saddle-ride vehicle is provided with the engine arranged downward of the main frame, in which the cylinder portion substantially horizontally extends forward from the crankcase, the carburetor is arranged on the one side and the air cleaner device is arranged the other side, upward of the cylinder portion, so that the air cleaner device can be effectively protected from the backfire from the engine by the element guard assembly and, thus, it is possible to cause the air cleaner device to be more adjacent to the engine and realize miniaturization of the saddle-ride vehicle.

Obviously, numerous modifications and variations of the present invention are possible in light of the above teachings. It is therefore to be understood that within the scope of the appended claims, the invention may be practiced otherwise than as specifically described herein.

What is claimed is:

1. An air cleaner device for a vehicle, comprising:
   an air cleaner case body including a peripheral wall defining an opening portion;
   a lid connected with the air cleaner case body, the lid having a first protrusion that is provided to surround the opening portion of the air cleaner case body;
   a resin air cleaner element provided between the air cleaner case body and the lid to be held by the air cleaner case body and the lid; and
   an element guard assembly provided inside the peripheral wall of the air cleaner case body, the element guard assembly comprising:
      a periphery contacting a part of the peripheral wall of the air cleaner case body;
      a side surface defined as a lid side of the element guard assembly; and
      a seal wall provided at the side surface to provide a seal between the resin air cleaner element and the air cleaner case body while positioning the resin air cleaner element, the seal wall having a second protrusion,
   wherein a periphery of the resin air cleaner element is interposed between the first protrusion and the second protrusion such that the resin air cleaner element is positioned and fixed by the first protrusion and the second protrusion,
   wherein the first protrusion extends in a direction towards the air cleaner case body,
   wherein the second protrusion extends in a direction towards the lid,
   wherein the first protrusion contacts a first planar side surface of the resin air cleaner element, and
   wherein the second protrusion contacts a second planar side surface of the resin air cleaner element, the second planar side surface being opposite to the first planar side surface.

2. The air cleaner device for a vehicle according to claim 1, wherein the element guard assembly is detachably mounted to the air cleaner case body.

3. The air cleaner device for a vehicle according to claim 1, wherein the air cleaner device is configured to be arranged laterally of a main frame extending rearward from a headpipe in a saddle-ride vehicle along a vehicle body center, and
   wherein the resin air cleaner element is flatly provided and configured to be arranged in such a manner that one of front and back surfaces of the resin air cleaner element faces outward of a vehicle body.

4. The air cleaner device for a vehicle according to claim 3, wherein the air cleaner case body includes
   an air intake port to take in air from outside of the air cleaner device,
   an air intake duct room communicating with the air intake port, and
   an element room in which the resin air cleaner element is housed.

5. The air cleaner device for a vehicle according to claim 1, wherein the element guard assembly includes a metallic plate-shaped element guard body and a frame-shaped resin plate which are overlapped with and bonded to each other,
   wherein the element guard body includes cancellous fine-mesh plates and a reinforcing plate which are overlapped with each other, wherein the reinforcing plate includes holes larger than meshes of the fine-mesh plates overlapped with each other, and wherein the frame-shaped resin plate has the seal wall provided at a side surface of an outer peripheral portion of the frame-shaped resin plate.

6. The air cleaner device for a vehicle according to claim 1, wherein the second protrusion projects from the side surface toward the resin air cleaner element to contact the resin air cleaner element.

7. The air cleaner device for a vehicle according to claim 1, wherein the resin air cleaner element has a flat planar plate shape.

8. The air cleaner device for a vehicle according to claim 1, wherein the resin air cleaner element is sandwiched between the first protrusion and the second protrusion.

9. A saddle-ride vehicle comprising:
a vehicle body having a main frame and a vehicle body center;
an engine mounted on the main frame;
a carburetor; and
an air cleaner device for the engine, the air cleaner device comprising:
an air cleaner case body including a peripheral wall defining an opening portion;
a lid connected with the air cleaner case body;
a resin air cleaner element provided between the air cleaner case body and the lid to be held by the air cleaner case body and the lid; and
an element guard assembly provided inside the peripheral wall of the air cleaner case body, the element guard assembly comprising:
a periphery contacting a part of the peripheral wall of the air cleaner case body;
a side surface defined as a lid side of the element guard assembly; and
a seal wall provided at the side surface to provide a seal between the resin air cleaner element and the air cleaner case body while positioning the resin air cleaner element,
wherein the air cleaner device is configured to be arranged laterally of the main frame extending rearward from a headpipe in the saddle-ride vehicle along the vehicle body center,
wherein the resin air cleaner element is flatly provided and configured to be arranged in such a manner that one of front and back surfaces of the resin air cleaner element faces outward of a vehicle body,
wherein the engine is arranged downward of the main frame and including a cylinder portion substantially horizontally extending forward from a crankcase,
wherein the carburetor is provided upward of the cylinder portion and arranged on one side of the cylinder portion, and
wherein the air cleaner device is provided upward of the cylinder portion and arranged on another side of the cylinder portion.

10. A vehicle comprising:
a vehicle body having a main frame and a vehicle body center;
an engine mounted on the main frame; and
an air cleaner device for the engine, the air cleaner device comprising:
an air cleaner case body including a peripheral wall defining an opening portion;
a lid connected with the air cleaner case body, the lid having a first protrusion that is provided to surround the opening portion of the air cleaner case body;
a resin air cleaner element provided between the air cleaner case body and the lid to be held by the air cleaner case body and the lid; and
an element guard assembly provided inside the peripheral wall of the air cleaner case body, the element guard assembly comprising:
a periphery contacting a part of the peripheral wall of the air cleaner case body;
a side surface defined as a lid side of the element guard assembly; and
a seal wall provided at the side surface to provide a seal between the resin air cleaner element and the air cleaner case body while positioning the resin air cleaner element, the seal wall having a second protrusion,
wherein a periphery of the resin air cleaner element is interposed between the first protrusion and the second protrusion such that the resin air cleaner element is positioned and fixed by the first protrusion and the second protrusion,
wherein the first protrusion extends in a direction towards the air cleaner case body,
wherein the second protrusion extends in a direction towards the lid,
wherein the first protrusion contacts a first planar side surface of the resin air cleaner element, and
wherein the second protrusion contacts a second planar side surface of the resin air cleaner element, the second planar side surface being opposite to the first planar side surface.

11. The vehicle according to claim 10, wherein the element guard assembly is detachably mounted to the air cleaner case body.

12. The vehicle according to claim 10,
wherein the air cleaner device is arranged laterally of the main frame extending rearward from a headpipe in the vehicle along the vehicle body center, and
wherein the resin air cleaner element is flatly provided and arranged in such a manner that one of front and back surfaces of the resin air cleaner element faces outward of the vehicle body.

13. The vehicle according to claim 12, wherein the air cleaner case body includes
an air intake port to take in air from outside of the air cleaner device,
an intake duct room communicating with the air intake port, and
an element room in which the resin air cleaner element is housed, the air intake port being opened between the main frame and a fuel tank provided at an upper portion of the main frame.

14. The vehicle according to claim 12, further comprising:
a carburetor,
wherein the engine is arranged downward of the main frame and including a cylinder portion substantially horizontally extending forward from a crankcase,
wherein the carburetor is provided upward of the cylinder portion and arranged on one side of the cylinder portion, and
wherein the air cleaner device is provided upward of the cylinder portion and arranged on another side of the cylinder portion.

15. The vehicle according to claim 10,
wherein the element guard assembly includes a metallic plate-shaped element guard body and a frame-shaped resin plate which are overlapped with and bonded to each other,
wherein the element guard body includes cancellous fine-mesh plates and a reinforcing plate which are overlapped with each other,
wherein the reinforcing plate includes holes larger than meshes of the fine-mesh plates overlapped with each other, and
wherein the frame-shaped resin plate has the seal wall provided at a side surface of an outer peripheral portion of the frame-shaped resin plate.

16. The vehicle according to claim 10, wherein the second protrusion projects from the side surface toward the resin air cleaner element to contact the resin air cleaner element.

17. The vehicle according to claim 10, wherein the resin air cleaner element has a flat planar plate shape.

18. The vehicle according to claim 10, wherein the resin air cleaner element is sandwiched between the first protrusion and the second protrusion.

\* \* \* \* \*